INVENTOR
John William Tinley
BY Oswald H. Milmore
ATTORNEY

United States Patent Office 3,435,536
Patented Apr. 1, 1969

3,435,536
DISCHARGING PARTICULATE MATERIAL FROM STORAGE MEANS
John William Tinley, Sawston, England, assignor, by mesne assignments, to Bangor Punta Operations, Inc., Hayward, Calif., a corporation of California
Continuation-in-part of application Ser. No. 457,022, May 19, 1965. This application Apr. 19, 1967, Ser. No. 632,060
Claims priority, application Great Britain, May 25, 1964, 21,488/64
Int. Cl. F26b *17/10*
U.S. Cl. 34—57   8 Claims

ABSTRACT OF THE DISCLOSURE

Particulate material remaining on the floor of storage means, such as a bin, silo, cargo container of a road vehicle or railroad car, after discharge of other material by gravity through an outlet opening in the floor, is removed by forming the floor with a multitude of inclined air passages directed toward the opening and supplying air under pressure to the underside of the floor, whereby there is formed an air current which sweeps the top of the floor and carries the particles toward the opening. The storage means may contain a drying cylinder which rises from the floor and through which drying air can be forced into the body of material stored within the storage means.

---

Figure 1:
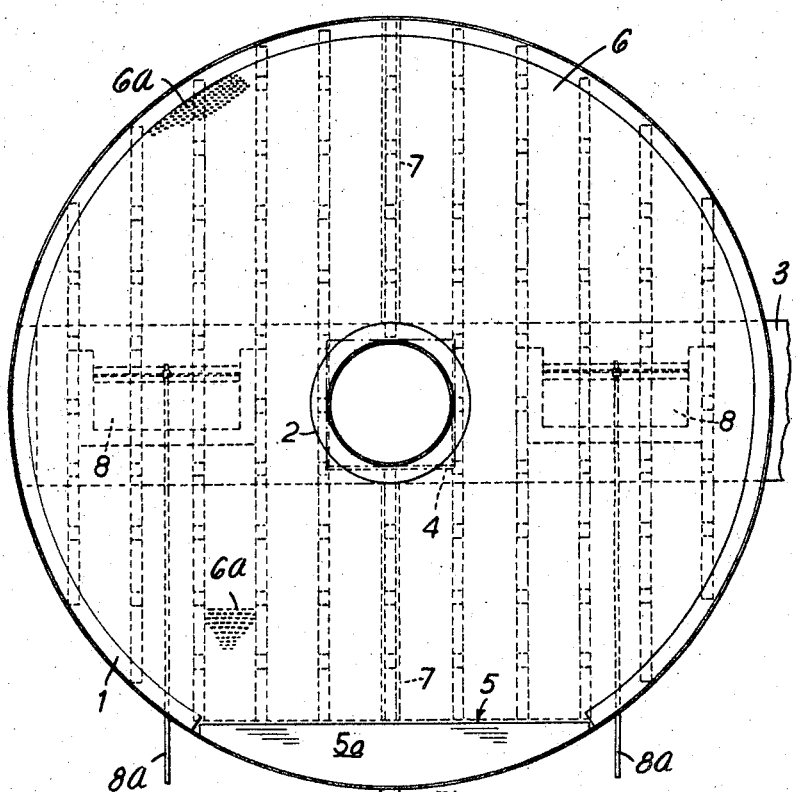

This is a continuation-in-part of my application, Ser. No. 457,022, filed May 19, 1965, now abandoned.

The invention relates to discharging particulate material, such as grain, coffee beams and sand, from the floor of storage means through an outlet opening in the floor, and is particularly although not exclusively applicable to the removal of such material from a silo or storage bin which may be fixed on the ground or which may form the cargo container of a road vehicle or a railway car. More particularly, the invention is concerned with removing from such storage means the residue of particulate material which remains on the floor after the free flow of the material through the outlet opening by gravity has ceased.

Most storage means, including silos, bins, and cargo containers of vehicles, in which particulate material is stored have at least one discharge opening formed in and extending over only a small fraction of the floor area, and the particulate material is removed by opening the passage therethrough (or by opening a communicating discharge duct) to permit free flow of the material through the opening in the floor. Eventually a residue of the material is left within the storage means, piled up as a heap at the angle of repose of the material, e.g., at an angle of 45°, and usually rising from the edge or edges of the opening. This residue must be removed manually which, besides being expensive, is an unpleasant and often a dusty job.

Heretofore the floors of such storage means were sometimes inclined at an angle steeper than the angle of repose of the material to be stored therein. However, this increases the cost of construction for a given storage capacity and is not always feasible, as in the case of portable container.

According to the present invention, means are provided for discharging such residual particulate material from the floor of storage means in which the floor has a grade less than the angle of repose, e.g., is horizontal, by providing at least a part of the floor with a multitude of inclined apertures or air passages directed to emit air jets moving generally toward the outlet opening, and providing means for delivering air under pressure to the underside of the floor, whereby said air jets form an air current moving with a strong component parallel to the floor surface toward the outlet opening, for entraining the residue of particulate material and sweeping it toward said opening.

The floor can be of any suitable contour, such as flat, curved, e.g., concavely upward (as the interior of a horizontal cylinder) or formed with a series of ridges; it may be horizontal or inclined (but with a grade less than the angle of repose). The invention is applicable in any construction in which at least on some part of the floor the inclination is such that a residue of particulate material can remain at its angle of repose after the free flow by gravity has ceased. It will be understood that the air passages need be provided only in that part of the floor on which such a residue can accumulate; thus, in the case of a circular tank on its side, such apertures would be provided only along the lowermost strip, in which the material can form a pile.

In a convenient arrangement, the floor is constructed of expanded material, which may be metal or plastic. The expanded material provides louvre-like air passages. Preferably, a plenum chamber is provided beneath the floor to which chamber air under pressure can be delivered and to which the apertures of the floor open directly.

Means can also be provided for delivering air to the interior of the storage space, which are can pass through the contents to dry the same, and this air may be delivered through a vertically extending duct having lateral discharge openings.

A partition may be provided across the plenum chamber to divide it into sections into which air can be selectively delivered; in this arrangement the partition may lie beneath a ridge which extends above the floor to subdivide the floor into corresponding sections which can be swept separately with the air current.

Figure 4:
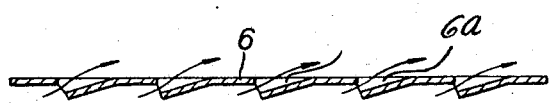
Figure 2:
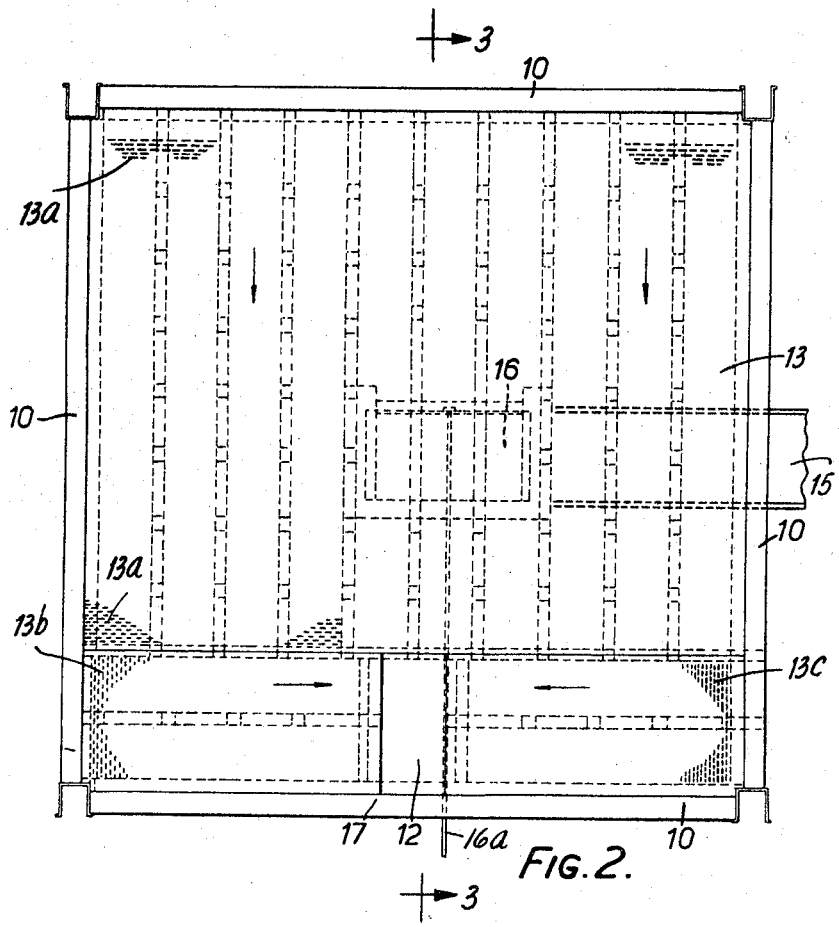
Figure 3:
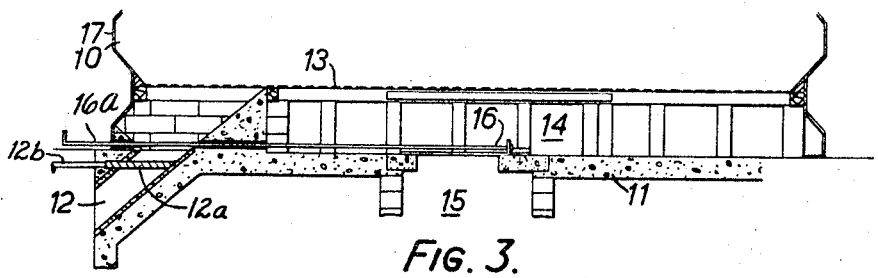

The invention can be executed in various ways, and two specific embodiments will now be described by way of example and with reference to the accompanying drawings, wherein:

FIGURE 1 is a plan of a silo embodying the invention;
FIGURE 2 is a plan of a bin embodying the invention;
FIGURE 3 is a cross section of the floor of the bin, taken on the line 3—3 of FIGURE 2; and
FIGURE 4 is a cross section through a part of the floor, on an enlarged scale, showing the gas passages.

In the embodiment shown in FIGURE 1, the invention is applied to a silo of the type comprising a cylindrical confining side wall 1 which can be formed with passages, e.g., made of expanded metal, mounted on a concrete or similar base and containing a vertical drying cylinder 2 formed of expanded metal. An air duct 3 extends below the base diametrically across the silo (from left to right as shown in the dotted lines in the drawing) and the bottom of the drying cylinder 2 opens into this duct. A fan, not shown, is provided to blow air along the duct and into the drying cylinder 2, from which it passes substantially radially through the grain or other particular material stored within the silo, thereby drying it. A flap valve 4 is provided to cut off the supply of pressurized air to the drying cylinder when desired. When the valve 4 is open air enters the drying cylinder.

The silo has an outlet passageway 5 for the discharge of particulate matter, such as grain, at the bottom, this passageway being situated to one side of the air duct 3 and adjacently to the side wall of the silo. This passageway communicates at its top with the interior of the silo through an outlet opening in a horizontal floor 6, the opening having an area which is a small fraction of the area of the floor. The passageway 5 is normally closed by suitable flow control means, such as a gate 5a controlled by a rod 5b. When this is opened the particular material can flow from the space above the floor by gravity through the outlet opening therein and through the passageway.

The floor 6 is supported about six inches above the concrete base of the silo and is formed throughout at least a part of the floor area, e.g., throughout all of the area except the outlet opening, of expanded metal. This metal is, in this embodiment, sheet metal having rows of perforations 6a which are formed by making cuts in the metal and deforming the sheet metal on corresponding sides of the cuts, so that each perforation is in effect defined by a louvre as is shown in FIGURE 4. All of these louvres are, in this embodiment, oriented with their flow axes directed in the same direction, toward the side of the floor at which the outlet passageway 5 is located. Also, the louvres project from the lower side of the sheet metal, so that the upper side of the floor is smooth. The particulate material rests on the smooth side. Air passing through the apertures forms an air current that has its principal flow component parallel to the floor.

It will be understood that the air passages may be formed in other ways that provide inclined passages. These should, preferably, be narrow enough to prevent the particulate material from falling down therethrough into the plenum chamber.

A wall 7, which may be built of bricks, extends diametrically across the concrete base and forms a partition which divides the plenum chamber between the base and the floor into plenum sections. This wall has, advantageously, a ridge situated above the floor and directly above the wall to subdivide the space above the floor into corresponding sections. This ridge may be higher in the region remote from the outlet passageway 5, but this is not essential. Air directed into these plenum sections is prevented from flowing into the central drying cylinder 2 by an imperforate mesh of the cylinder where the cylinder passes through the plenum chamber, the mesh blanking off this part of the cylinder.

An opening is provided from the air duct 3 into each section of the plenum chamber and these openings are closed by sliding valves 8 having actuating rods 8a. With these valves closed, material such as grain within the silo can be dried by opening the flap valve 4 to admit air into the drying cylinder or duct 2, from which it can pass substantially radially outwards. When it is desired to discharge the particulate material, the discharge passageway 5 is opened and the material flows freely by gravity through the outlet opening in the floor leading to this passageway, however leaving a residue of material piled up at the natural angle of repose from the edges of the opening to the confining side walls.

To discharge this residue, the valves 8 are opened (the flap valve 4 being closed). Air then passes from the duct 3 through the opened valves into the two sections of the plenum chamber beneath the floor 6 and thence through the air passages in the floor. The air is directed more or less parallel to the floor surface toward the outlet opening and will entrain and move the residual particles toward this outlet, into which they fall by gravity. The relatively shallow layer of particles near this opening will move first, and the pile of particles more distant from the opening slip down to take the place of the discharged material, until eventually all of the residual material is discharged.

By opening only one of the valves 8 at a time, portions of the floor can be cleared of residue in succession, requiring only a lesser air flow from the duct 3 than when the entire floor is swept with air in one operation. The ridge rising above the floor over the partition 7 is then useful to confine the residual material to one section of the floor area.

In this embodiment, wherein all of the gas passages are oriented in a common direction, the width of the outlet opening in the floor must be sufficient to ensure that the confining side wall 1 is, at each end of the opening, oriented with a sufficient inclination to the chord defining the inner edge of the opening to deflect air and entrained particulate material into the opening. In the case of a container with a flat wall, such as a rectangular bin or a horizontal cylindrical tank, it is not always convenient to make the outlet opening so wide as to extend the full length of the adjacent wall, and it is in such cases preferred to provide different orientations to the air passages in different portions of the floor, as will be illustrated in the next embodiment.

In the embodiment shown in FIGURES 2 and 3, the invention is applied to a square or rectangular bin, which is provided with planar outside walls 10 standing on a concrete base 11. An inclined outlet duct 12 extends downwardly from one side of a perforated floor 13 which is mounted on wooden battens in spaced relation above the base 11 to provide a plenum chamber or space 14. An air duct 15 is provided beneath the base 11 and communcates with the space 14 at its end. The outlet duct 12 is normally closed by suitable flow control means, such as a gate 12a controlled by a rod 12b. A slide valve 16 can open or close the opening which leads from the air duct 15 to the plenum chamber 14 beneath the floor, this valve having a long control control rod 16a. The floor 13 is made of expanded metal or plastic or other sheet material, formed with louvres. Throughout most of the floor area these louvres are oriented with their flow axes directed toward the side wall 17 of the bin whereat the outlet duct 12 is situated. These louvres are shown at 13a. The narrow, strip-shaped part of the floor which is adjacent to this wall has its louvres 13b or 13c oriented with flow axes parallel to the side wall 17 and directed to the outlet opening, the axes of the louvres 13b and those of the louvres 13c being directed toward each other, so that residual material that is left on the floor after gravity discharge is first swept toward the wall 17 by the air current from the louvres 13a, and the portion of the residue swept into the corners of the bin is then swept into the opening by air from the louvres 13b and 13c. This arrangement of apertures having different orientations is necessary in square or rectangular containers whenever the outlet opening is smaller than the wall length, and is also applicable to other containers, such as circular containers.

It is evident that the floor in either embodiment need not be formed with gas passages throughout its area; thus, the floor may include imperforate, ridged sections that subdivide the floor into long, narrow bands which are provided with air passages such as louvres, the slopes of the ridged sections being steeper than the angle of repose. This arrangement also makes it possible to sweep the floor with gas supplied at a lesser flow rate, because only a fraction of the area has air passages. Also, in the second embodiment the plenum chamber 14 may be subdivided into sections, as was shown for the first embodiment.

I claim:

1. In storage means for particulate material having confining side walls, a floor, an outlet opening for the gravity discharge of said material from the floor and means for controlling the discharge of material from the floor through said opening, the grade of said floor and the height of said side walls being such that a residue of said material can remain on said floor at an angle of repose ascending from said outlet opening after discharge of the bulk of said material by gravity therethrough, the movement of: means for supplying a gas under pressure to the underside of said floor, and a plurality of gas passages extending through said floor having coordinated orientations for forming a current of gas flowing along the floor toward said opening for sweeping said residue from the floor to the opening.

2. The improved storage means defined in claim 1 wherein said outlet opening is situated near a side wall and has a width such that a part of the floor is situated at least at one end of the opening, the gas passages in a part of the floor are oriented with their axes directed substantially toward said side wall, and the gas passages in said part of the floor at the end of the opening are oriented with axes substantially parallel to the said side wall and toward the opening.

3. The improved storage means defined in claim 2 wherein a part of said floor is situated at each end of the outlet opening and the gas passages in each of said parts are oriented with their axes directed generally toward each other.

4. The improved storage means defined in claim 1 wherein said means for supplying gas includes a plenum chamber situated beneath the floor and in immediate communication with said gas passages, said storage means including, further, partition means dividing the plenum chamber into sections each extending beneath a fractional part of the floor area, and valve means for selectively admitting gas under pressure into said sections.

5. In combination with the improved storage means defined in claim 1, means for delivering gas into the mass of particulate material contained within said storage means for passage through said mass to dry the material.

6. The storage means defined in claim 5 wherein said means for delivering gas into the mass includes a vertically extending duct situated within said side wall and formed with lateral outlet openings distributed vertically.

7. The storage means defined in claim 6 wherein said duct is formed of expanded metal and rises from the said floor, in combination with floor control means for delivering gas under pressure to the bottom of said duct.

8. The improved storage means defined in claim 1 wherein said means for supplying gas to the underside of the floor includes a plenum chamber situated beneath the floor and in immediate communication with said gas passages and a gas supply duct communicating with said plenum chamber, said storage means including, further, a vertically extending duct which rises from said floor and is at its bottom in communication with said gas supply duct, and flow control means for selectively supplying gas from said supply duct to said plenum chamber or to said vertically extending duct, said vertically extending duct having lateral openings for the passage therethrough of gas for flow through the mass of material contained within said storage means to dry the material.

References Cited

UNITED STATES PATENTS

| 2,929,152 | 3/1960 | Berner. | |
| 3,304,619 | 2/1967 | Futer | 34—10 |
| 3,307,596 | 3/1967 | Stockel et al. | 302—59 X |
| 3,354,933 | 11/1967 | Wengeler. | |

FOREIGN PATENTS

| 950,033 | 2/1964 | Great Britain. |

JOHN J. CAMBY, *Primary Examiner.*